Figure 1:
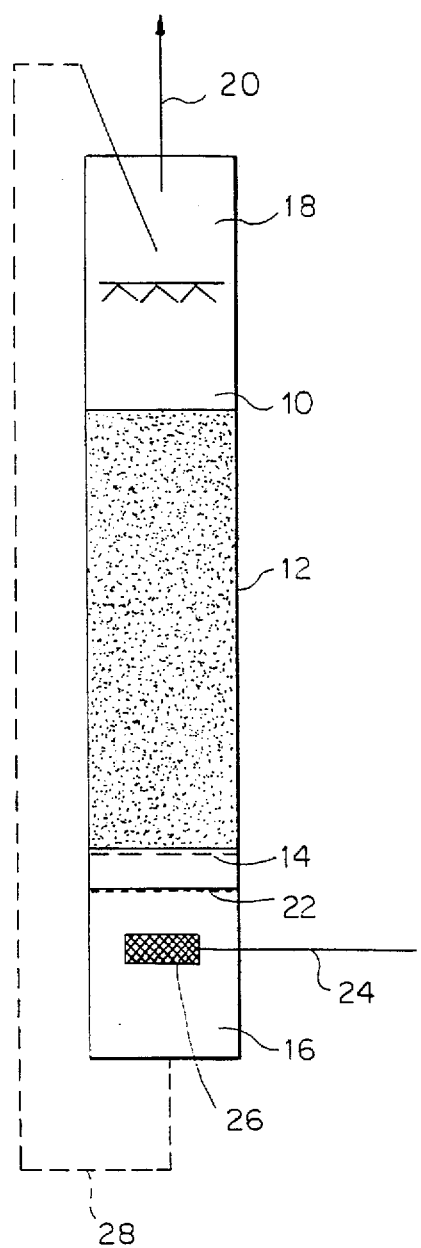

United States Patent [19]

Hartikainen et al.

[11] Patent Number: 5,747,331
[45] Date of Patent: May 5, 1998

[54] PROCESS AND APPARATUS FOR THE PURIFICATION OF GASES

[75] Inventors: Tarja Terttu Hartikainen; Pertti Juhani Martikainen; Arvo Aukusti Juhani Ruuskanen, all of Kuopio; Kari Antero Mutka, Jyväskylä ; Timo Martti Tapio Nyrönen, Palokka; Markku Tapio Källström, Jyväskylä ; Minna Kristiira Vanhatalo, Vaajakoski, all of Finland

[73] Assignee: Vapo Oy, Jyvaskyla, Finland

[21] Appl. No.: 714,133

[22] PCT Filed: Mar. 16, 1995

[86] PCT No.: PCT/FI95/00140

§ 371 Date: Nov. 18, 1996

§ 102(e) Date: Nov. 18, 1996

[87] PCT Pub. No.: WO95/24960

PCT Pub. Date: Sep. 21, 1995

[30] Foreign Application Priority Data

Oct. 7, 1994 [FI] Finland ................................. 944710
Mar. 16, 1996 [FI] Finland ................................. 941247

[51] Int. Cl.$^6$ ................. B01D 53/34; B01D 53/00; B01D 53/36; B01D 53/22; C01B 17/16; C12M 1/04; C12N 1/20

[52] U.S. Cl. .................. 435/266; 435/252.5; 423/220; 423/239; 95/149; 296/1

[58] Field of Search .................... 435/226, 252.5; 423/220, 230; 95/149

[56] References Cited

U.S. PATENT DOCUMENTS

| | | | |
|---|---|---|---|
| 3,843,464 | 10/1974 | Usami et al. | 195/2 |
| 4,544,381 | 10/1985 | Schmidt et al. | 55/89 |
| 4,869,824 | 9/1989 | Melin et al. | 210/615 |
| 4,968,622 | 11/1990 | Berzaczy et al. | 435/266 |
| 4,976,751 | 12/1990 | Schippert et al. | 55/84 |
| 5,236,677 | 8/1993 | Torres-Cardona et al. | 423/230 |

FOREIGN PATENT DOCUMENTS

| | | |
|---|---|---|
| 0186925 | 7/1986 | European Pat. Off. . |
| 3620728 | 12/1987 | Germany . |
| 3428798 | 8/1989 | Germany . |
| 2126917 | 5/1990 | Japan . |

OTHER PUBLICATIONS

Japan Abstract 2–26615, Jan. 29, 1990.

Plas et al, "Degradation of Carbondisulphide by a Thiobacillus Isolate", Applied Microbiology Biotechnology vol. 38, pp. 820–823 (1993).

VDI Berichte 735, Biologische Abgasreinigung, VDI Verlag, Dusseldorf, 1989, pp. 7–24, 25–39, 89–108, 129–138, 293–312, 331–339.

Ch. Plas et al, "Biologische Oxidation, Von Schwefelkohlenstoff Durch ein Thiobacillus–Isolat", Wasser—Abwasser 132(1991) Nr. 7, pp. 419–421.

Biotechnology, Ed. H.J. Rehm and G. Reed. Weinheim, N.Y., vol. 8:432–448, Nov. 1988.

*Primary Examiner*—Cecilia Tsang
*Assistant Examiner*—Michael Borin
*Attorney, Agent, or Firm*—Browdy and Neimark

[57] ABSTRACT

The invention relates to a process and an apparatus for the removal of sparingly-soluble gaseous substances, especially sulfur-containing substances from waste gases with the aid of microorganisms. The waste gas containing the sparingly-soluble gas is directed (24) in the form of small gas bubbles into a suspension (16) of degrading microorganisms. A gas which has been pre-cleaned in this way is preferably led to another bioreactor (10), where microorganisms degrade the contaminant. The invention also relates to a new microorganism which is capable of degrading carbon disulfide and hydrogen sulfide.

27 Claims, 3 Drawing Sheets

PROCESS AND APPARATUS FOR THE PURIFICATION OF GASES

The present invention relates to a process for the removal of sparingly-soluble gaseous contaminants from gases. The gases to be purified especially comprise industrial and/or agricultural waste gases which contain as noxious components gases such as carbon disulfide, hydrogen sulfide, dimethyl sulfide, mercaptane, styrene, toluene, etc. which are sparingly soluble and which are mostly toxic. The present invention also relates to a purification apparatus for use in the process as well as a microorganism which is advantageously utilized in the process.

The venting of various waste gases into the environment is restricted due to environmental protection and various regulations. While certain measures can be used to reduce the amount of emissions, it has not been possible to eliminate the generation of noxious gases in various situations.

Bioscrubbing and biofiltration are traditional biological processes for the purification of waste gases. In bioscrubbers the noxious components of a gas are absorbed into water or into an active sludge and the degradation takes place in a subsequent separate stage. According to the prior art a satisfactory bioscrubbing will be achieved only when purifying a gas which is easily dissolved in the scrubbing liquid.

Biofilters utilize filters filled with an organic material such as compost, peat, wood bark or a corresponding material, or packed reactors filled with inert packing bodies, so called trickling filters. Microorganisms capable of degrading the noxious component are immobilized in the solid packing and said microorganisms degrade the component as the gas passes through the filter. According to the prior art, biofiltration has been used also for sparingly-soluble gases.

Recently, microorganisms have been found which are capable of degrading several noxious and toxic gases which previously were considered non-degradable. Thus, a publication called "VDI Berichte 735, Biologische Abgasreinigung, VDI Verlag, Düsseldorf, 1989" discloses processes for the biological degradation of gases such as xylene, toluene, styrene, dichloromethane, 1,2-dichloroethane, hydrogen sulfide, carbon disulfide, etc. by the action of microorganisms.

Various microorganisms useful for biological degradation purposes are commercially available from various depositories. Moreover, the person skilled in the art knows that microorganisms tolerating the pollutant in question will usually often be found living in samples taken from the polluted site such as the sewage or the like locality of an industrial site or farm. By performing a selection of the microbe cultures in such samples it will be possible to find strains of microorganisms which are capable of degrading the pollutant in question, provided that the pollutant is at all biologically degradable.

It is, for example, known that it is possible to remove hydrogen sulfide and carbon disulfide from waste gases by biofiltration in certain circumstances. In the above mentioned publication, VDI Berichte 735, there are several occurrences disclosing biodegradation of carbon disulfide and/or hydrogen sulfide. Thus, pages 129 to 138 of said VDI publication disclose the use of Thiobacillus microorganisms for the degradation of hydrogen sulfide in waste gases generated in a waste water purification plant. After an adaption time, the microorganisms were able to degrade more than 99% of the hydrogen sulfide in the raw waste gas. The degradation was performed in a trickling filter operating in a counter-current fashion.

Said VDI publication suggests, on pages 293 to 312, the removal of hydrogen sulfide from a waste gas by using a compost or peat filter including microorganisms of the genus Thiobacillus. However, the filter material had to be changed as soon as after 8 weeks of tests due to the formation of sulfurous deposits.

Said VDI publication further suggests, on pages 331 to 339, the removal of hydrogen sulfide and carbon disulfide from waste gases in a compact compost filter by the use of microorganisms such as those belonging to the genus Thiobacillus. The waste gas was moisturized to a moisture content of at least 95% with water prior to being led into a pressure chamber below the biofilter. The pH of the filter sank to a value of 1. When the waste gas contained about 140 mg $CS_2$ and about 80 mg $H_2S$, the filter was capable of removing about 60% of the carbon disulfide and about 85% of the hydrogen sulfide.

In the publication Appl. Microbiol. Biotechnol. (1993) 38: 820–823, Plas, C. et al. disclose the degradation of carbon disulfide by a microorganism belonging to the genus Thiobacillus. Said microorganism was isolated from a trickling filter used for treating a waste gas containing hydrogen sulfide and carbon disulfide. According to said publication, the microorganism was capable of using carbon disulfide as its sole source of energy and to oxidize carbon disulfide at a pH of 7.0 at the substrate concentration of as high as 100 mg $CS_2$/l.

JP Patent 2-126917 describes a process for the purification of a gas containing hydrogen sulfide. The process is performed in a peat filter having sulphur bacteria immobilized therein. The bacteria are regenerated by washing and neutralization, whereby the formed sulfate is leached off.

In a corresponding way the above mentioned VDI Publication, among others, teaches degradation also of several other noxious gases with the aid of microbes. Among the gases mentioned in said publication dichloromethane and 1,2-dichloroethane (page 7 to 24), chlorinated hydrocarbons, chlorobenzenes, toluene, xylene, styrene, acrylic compounds (p. 25 to 39), phenol, formaldehyde, ammonia (p. 89 to 98), methanol, DMF, nitrobenzene, nitrochlorobenzene, toluene, aniline, chloroaniline (p. 99 to 108), etc. may be mentioned.

Although the above mentioned processes have made it possible to partly eliminate also sparingly-soluble gases, such as carbon disulfide and hydrogen sulfide from waste gases, these processes have several disadvantageous features, such as short biofilter age and incomplete degradation of the noxious gases.

DE Patent 3602728 discloses an apparatus for the bioscrubbing of noxious gases by directing a waste gas through a microbe suspension on two consecutive plates. The gas is led into the suspension through slots or holes and noxious gases which dissolve in the liquid will be degraded due to microbial activity either immediately or in a separate reaction vessel. According to the applicant (VDI Berichte 735, p. 103) the apparatus is suitable only for gases which dissolve easily, i.e. the Henry constant of which is <1.

Thus, there is a need in the art to provide a simple and reliable solution for the removal of sparingly-soluble gases, such as carbon disulfide, hydrogen sulfide, dimethyl sulfide, styrene etc. from gases containing the same. The apparatus to be used should be simple and reliable and should require a minimum of operations.

The object of the invention is thus to provide a simple and effective method for the removal of sparingly-soluble gases from gases.

A special object of the invention is to provide a method for the removal of sulphur-containing gases such as carbon disulfide and/or hydrogen sulfide from waste gases.

An object of the invention is also to provide an apparatus for the removal of sparingly-soluble gases from gases. The apparatus of the present invention is simple and effective and therefore it is relatively small-sized.

An object of the invention is also to disclose a novel microorganism belonging to the genus Thiobacillus and which is especially effective in degrading carbon disulfide and/or hydrogen sulfide in the present method and apparatus.

The features of the present invention are disclosed more exactly in the appended claims.

Thus, the present invention relates to a method for the removal of sparingly-soluble gaseous substances from a gas by bringing said gas into contact with microorganisms capable of degrading said sparingly-soluble gaseous substances, characterized in that said gas containing said sparingly-soluble gaseous substance is led into a microbe suspension containing microorganisms capable of degrading said substance such that said gas forms small bubbles in said microbe suspension, on the surface of which bubbles the microorganisms are able to degrade the sparingly-soluble gaseous substance, and, if needed, the gas which has risen to the surface of said suspension is directed to another similar or different biodegradation stage.

Thus, the present invention relates to a method for the removal of sparingly-soluble sulphur-containing gaseous substances from a gas by bringing said gas into contact with microorganisms capable of degrading said sulphur-containing substances, characterized in that said gas containing said sparingly-soluble sulphur-containing substance or substances is led into a microbe suspension containing microorganisms capable of degrading said substance while distributing said gas in the liquid into gas bubbles such that said microorganisms degrade at least a part of said sulphur-containing substance as said bubbles rise towards the surface of said microbe suspension and that, if needed, the gas which has risen to the surface of said suspension is directed to another similar or different biodegradation stage.

The gas is preferably led below the surface of the microbe suspension through a gas bubbling means. the opening size of which is about 10 μm to 2 mm. In certain circumstances said opening may also be larger, for instance, where the degrading microorganism is especially effective. In industrial applications the application of very small holes may cause too great pressure losses and small holes may become blocked due to microbe growth.

The form of the gas feeding openings is not very critical. The object is only to provide a maximum active surface area for the degrading activity of the microbes. The best degrading effect is obtained by using a porous gas distribution means having a pore size of about 100 to 500 μm.

The gas which is led into the microbe suspension may alternatively be broken into small bubbles by mixing, shaking or in some other way, for example, by passing the gas through one or more gratings.

The microorganism which is to be used in the present method is preferably an aerobic organism and the gas is preferably an oxygen-containing gas, such as an industrial waste gas which contains air. The gas is most preferably led into the suspension through a multitude of small openings whereby small bubbles will be formed in the suspension. On the surface of said bubbles the degradation reaction may take place. Minimum size gas bubbles will allow the microbes in the suspension to degrade the gaseous substance more effectively even though said substance will not be dissolved in the liquid. This is, in fact, a surprising observation since in view of the prior art, a skilled person believed that a gas had to dissolve in the liquid in order to make it possible for the degradation to take place in said liquid.

In connection with the present invention it was, however, surprisingly noted that microorganisms are found for most sparingly-soluble gases, which microorganisms are capable of degrading said sparingly-soluble gas as it is bubbled through a microbe suspension. A suitable degrading microbe will be located from among those known or unknown microorganisms which tolerate said gas by allowing said gas to bubble through a suspension containing such microorganism(s). As was mentioned above, a number of such microorganisms will generally be found from environments where said gas normally exists. The degradation of said gas in the suspension can be monitored either by monitoring the composition of the exiting gas or by observing whether reaction products indicating degradation are formed in the suspension.

In case the gas which has risen to the surface of the suspension in the method of the present invention still contains too large amounts of the gas which is to be degraded, said gas is immediately led to another corresponding microbe suspension. The gas may alternatively be directed to another type of biodegradation stage, such as a bioreactor or a biofilter, the filler or packing of which contains immobilized therein microorganisms capable of degrading said gas.

As the gas is bubbled through the microbe suspension it will be substantially completely moisturized, i.e. it will have moisture content of about 100%. This moisturization is especially advantageous in case the second biodegradation stage comprises a biofilter such as a peat or compost filter, since the moisturized gas will provide a very good and uniform moisturization of the filter material. This will result in a significant improvement in the operating capacity of the filter. Due to the uniform moisturization the filter will retain a uniform moisture and it will not form dry and consequently non-functional areas which are detrimental to the activity of the biofilter. This is one substantial additional benefit of the method of the present invention.

It has further been observed that a moisturization of the gas is advantageous also in cases where the second biodegradation stage comprises a bioreactor filled with packing bodies, i.e. a trickling filter. The moisture of the gas reduces the need for recirculation of microbe suspension. It is thus not necessary to add the same amount of liquid to the top of the bioreactor as if the gas is dry. It is thus possible to adapt the suspension feed according to other factors such as the amount of intermediary products or end products which should be washed from the reactor.

In the preferred embodiment of the present invention a two-stage biodegradation is provided. In the first stage, microbes present in a liquid suspension degrade sparingly-soluble gaseous substances present in a gas flowing through said suspension. In the second stage, the pre-purified gas is contacted with immobilized microorganisms in order to finally degrade any sparingly-soluble gaseous substances which may still remain in said gas.

According to the present invention it is preferable to adjust the pH of the degrading microbe suspension to a value which is suitable for the activity of the microorganisms used in the process. For instance, in the oxidation reaction of sulphur sulfuric acid is produced and it is preferable to use a base for neutralizing any formed sulfate. It is, for instance, suitable to use $Ca(OH)_2$ for the neutralization whereafter the formed sparingly-soluble calcium sulfate may easily be removed from the system.

The present invention also relates to an apparatus for the removal of sparingly-soluble gaseous substances from gases by the use of microorganisms capable of degrading said sparingly-soluble substances. The apparatus according to the invention comprises a microbe suspension chamber having below its liquid filling level a feed pipe for the gas which is to be purified. Said apparatus also comprises at least one bioreactor in direct communication with said chamber, the packing of said reactor comprising immobilized therein microorganisms capable of degrading said sparingly-soluble substance.

The gas feed pipe preferably ends in perforated pipes or sinter pipes for distributing the gas as small bubbles below the liquid filling level of the suspension chamber. The pore size of the sinter is preferably about 10 to 500 μm, more preferably about 100 to 200 μm. Alternatively, the apparatus includes a mixer or a grating structure for reducing the size of the gas bubbles.

Any microorganism or mixture of microorganisms which is capable of degrading the sparingly-soluble gaseous component in the conditions of the process according to the present invention may be used as the immobilized microorganism of the invention. Microorganisms which will function according to the invention may be obtained from depositories or they may be isolated from nature by means known per se.

A culture of a microorganism has, however, been surprisingly isolated in connection with the invention, which microorganism is especially effective in the degradation of carbon disulfide and hydrogen sulfide and which functions especially well in the conditions of the process of the present invention. It is especially to be noted that said microorganism is capable of effectively oxidizing carbon disulfide and hydrogen sulfide in a microbe suspension as well as when it is immobilized in the packing of a filter.

The novel microorganism according to the invention has been observed for the first time in connection with the present invention. It has been isolated from a microbe population group existing in nature and in accordance with the invention it has been for the first time provided in an industrially useful form.

The microorganism of the invention has been assigned the name Thiobacillus sp. TJ330 and it has been deposited on Feb. 15, 1994 in accordance with the Budapest Treaty in the depository Deutsche Sammlung von Mikro-organismen under the number DSM 8985.

The microorganism of the invention has degraded as much as 5600 mg/m$^3$ $CS_2$ and 2160 mg/m$^3$ $H_2S$ from a gas containing carbon disulfide and hydrogen sulfide.

BRIEF DESCRIPTOIN OF THE DRAWINGS

Figure 2:
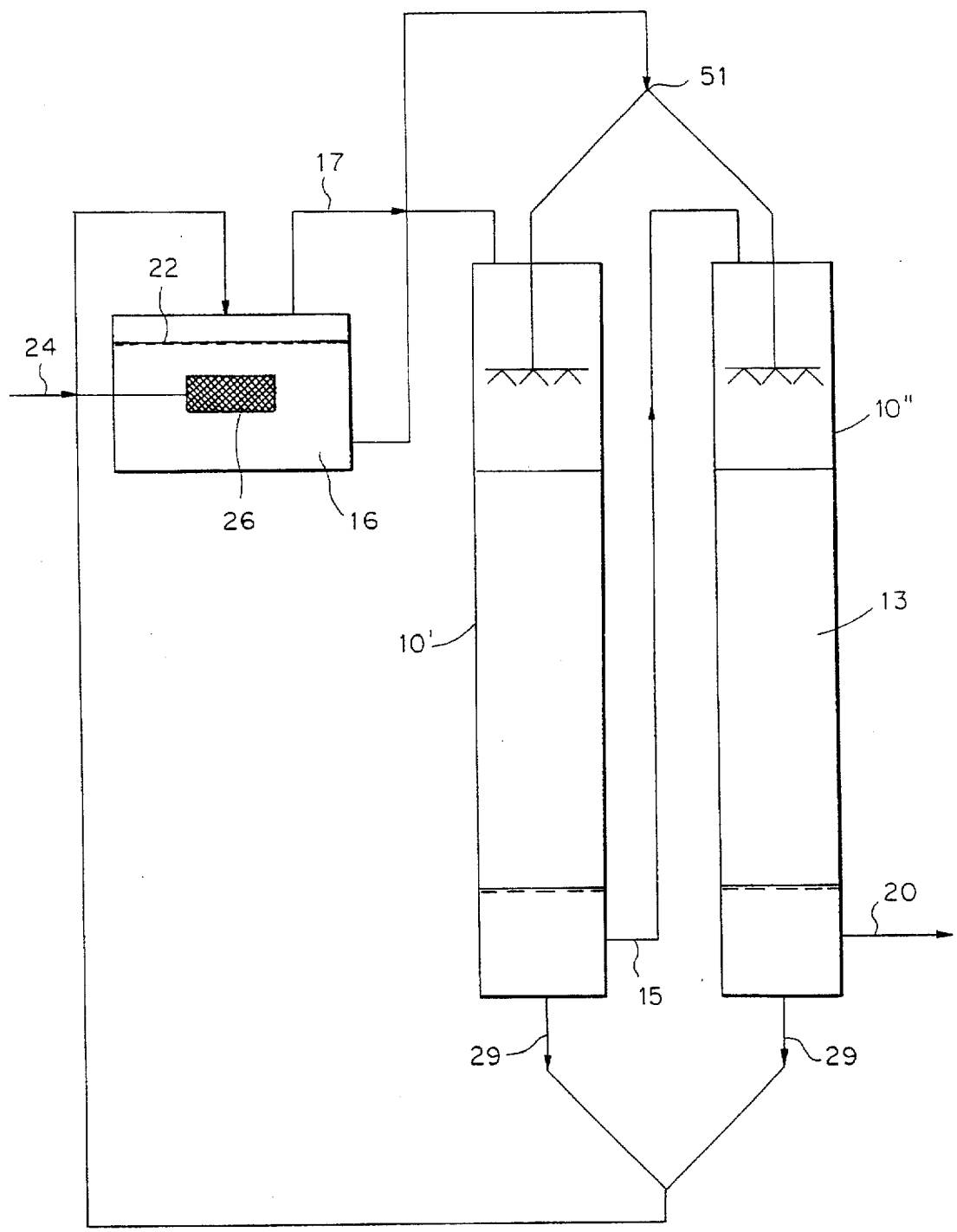

The invention will be described in more detail in the following with reference to the appended drawing wherein FIG. 1 shows a preferred apparatus according to the invention for the purification of gases, FIG. 2 shows an alternative apparatus according to the invention.

Figure 3:
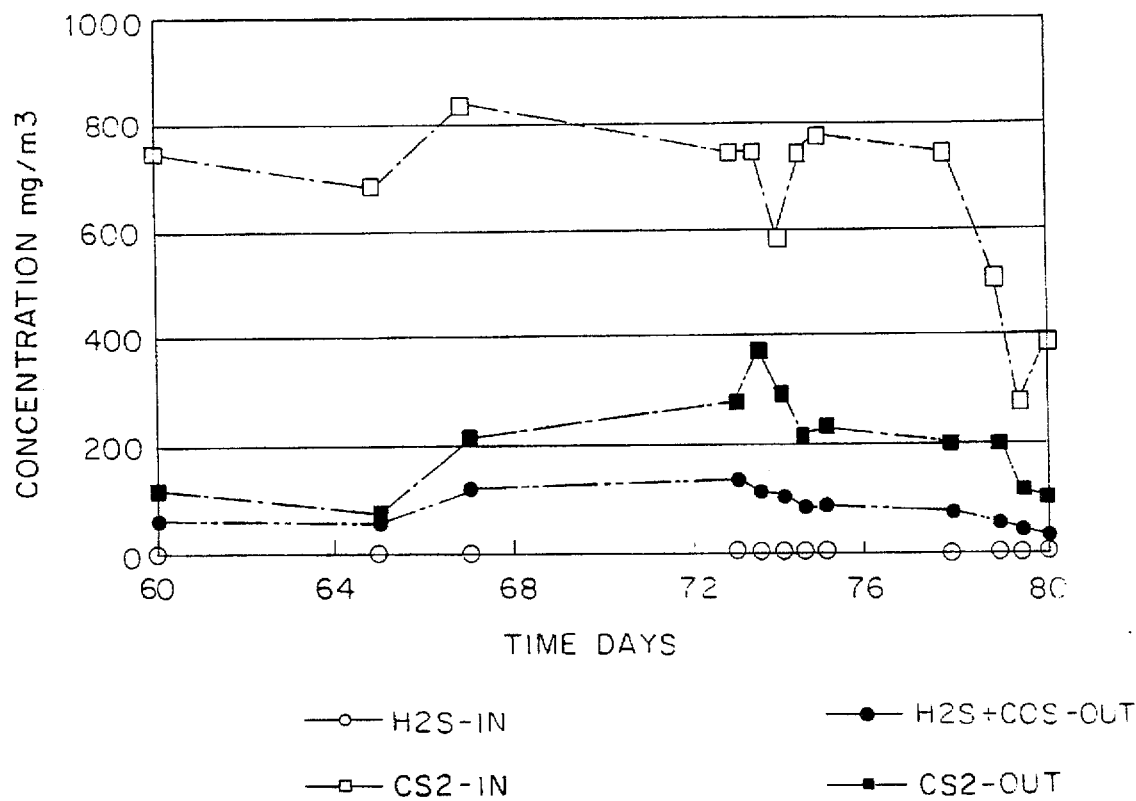
Figure 4:
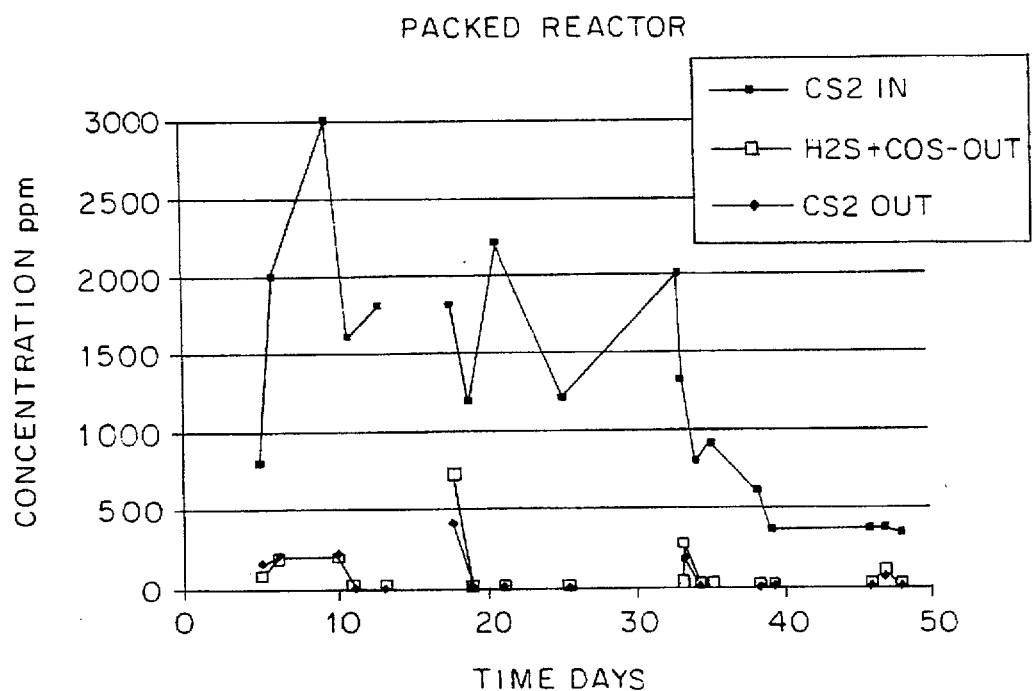

FIGS. 3 to 4 show graphically the degradation of carbon disulfide and hydrogen sulfide with the aid of the preferred microorganism of the invention.

In the apparatus of FIG. 1 the reference number 10 indicates a bioreactor having in its central portion solid packing bodies 12. Microorganisms capable of degrading a sparingly soluble gas have been immobilized onto the packing 12. The packing 12 is placed on a perforated partition plate 14. Below said partition plate 14 in the bioreactor 10 there is a suspension chamber 16 containing a microbe suspension of the degrading microorganisms in water. An outlet tube 20 for purified gas is connected to a gas space 18 at the top of the bioreactor 10.

A gas feed tube 24 extends into the suspension chamber 16 in the lower portion of the bioreactor 10 below a liquid level 22. According to an especially preferred embodiment of the invention said feed tube 24 ends in a sinter tube 26 through which the contaminated gas is fed into the microbe suspension as finely distributed small bubbles. In the shown embodiment the pore size of said sinter is about 160 to 200 μm.

From the lower portion of the suspension chamber 16 a suspension recirculation tube 28 leads to the upper portion 18 of the bioreactor 10, possibly via mixing, clarification, etc. vessels. From said upper portion 18 the suspension is uniformly distributed over the packing 12 of the bioreactor 10.

The packing 12 of the bioreactor may be any kind of commercial packing bodies which are suitable as carriers for the microorganisms to be used and which tolerate the acid conditions prevailing during the reaction. Glass beads provide a useful solution, since any formed sulfate will easily be washed away from their surface. On the other hand, there are several commercially available types of packings having a larger surface area and these are often more advantageous in view of microbe growth and they also improve the contact time between gas and microorganisms. An example of such packings comprises ceramic packing bodies.

The apparatus preferably comprises a heater (not shown) which may be arranged in any part of the arrangement. The suspension recirculation system may further contain a feed arrangement for nutrient solution. Nutrients such as nitrogen, phosphorus, vitamins, may be fed to any point of the recirculation system. Said nutrient solution is preferably simultaneously a buffer solution in case the gas to be degraded and/or the used microbe requires adjustment of the pH.

In the use of the apparatus the suspension chamber 16 is filled with a solution of microorganisms capable of degrading the gas which is to be degraded. The conditions are controlled so that the chamber will provide an advantageous cultivation environment for the microorganisms as regards temperature, pH and nutrients. The contaminated gas is fed into the suspension chamber 16, which is filled with said microbe suspension, in such a way that said gas will be distributed as fine bubbles through the sinter tube 26. In this way the microorganisms in the microbe suspension will be capable of degrading the sparingly soluble gaseous components in said gas, the small gas bubbles providing a large surface area and an oxygen rich environment for the microorganisms.

The gas bubbles which have become wetted in said microbe suspension rise through the suspension to the surface 22 thereof and the gas continues through the perforated partition plate 14 to the packing filled reactor 10 which acts as a so called "trickling filter". The microbe suspension will drain counter-current to the rising gas between the packing bodies in such a way that the microbes become immobilized on the surfaces of said packing bodies 12. As the gas flows through the bioreactor, the immobilized microorganisms will degrade any of the still remaining component which is to be removed. Any gaseous reaction products are discharged with the exiting gas from the top of the bioreactor and any liquid or solid products will drain with the microbe suspension to the suspension chamber 16, from where they may be removed at need e.g. by precipitation. The pH of the suspension is preferably adjusted to a range which is suitable for the microbes. For instance, the microorganism of the invention, Thiobacillus Sp. TJ330 DSM 8985 has a preferred pH range of about 1.5±0.5.

The retention time of the gas in the reactor is also adjusted so that it is within an advantageous range for the used microorganisms. A suitable time can be determined, for example, by monitoring the emission amounts in the gas being discharged from the outlet tube. In the process according to the invention and in the laboratory size apparatus of FIG. 1 a suitable retention time in the degradation of carbon disulfide and hydrogen sulfide has been found to be 1.5 to 10 minutes, preferably about 2 minutes. If the retention time sinks below 0.5 minutes, the biodegradation result will be significantly reduced (the retention time was calculated on the basis of the volume of an empty reactor).

The apparatus of FIG. 2 shows two bioreactors 10' and 10" connected in series and filled with a filler material 13. A gas tube 15 connects the lower portion of the first reactor 10' to the upper portion of the second reactor 10". In the vicinity of the reactor 10' there is a suspension chamber 16 being fed by a gas feed tube 24 ending in a sinter tube 26. The upper portions of the bioreactors 10' and 10" are provided with liquid feed tubes 51 and their bottom portions are provided with liquid outlet tubes 29. A discharge tube 20 for purified gas is connected to the bottom portion of the second reactor 10".

The bioreactor filler material of the apparatus according to FIG. 2 comprises a filter material such as peat, compost, ground wood bark, or the like. According to the invention an especially preferred filter material comprises peat and especially a peat mixture containing a large portion of cotton grass, which will improve the life of the filter.

Microorganisms capable of degrading the gas to be removed are immobilized into the filler material. The suspension chamber 16 contains a microbe suspension of the kind described in connection with FIG. 1 above. In the solution according to FIG. 2 the suspension chamber 16 may contain another microbe strain than the reactors 10' and 10". However, in the preferred embodiment the suspension chamber and the reactors contain the same microorganism which is preferably the preferred microorganism of the invention.

In the use of the apparatus the gas to be purified is fed, possibly via a compressor, below the liquid surface of the suspension chamber 16. The gas is distributed into the microbe suspension, rises as small bubbles to the surface thereof and is then directed through a tube 17 to the upper portion of the first reactor 10'. In this embodiment the gas flows in a down flow mode downwards through the filler material. Thus, the gas which has been pretreated in the suspension chamber 16 and has become thoroughly wetted, will bring the bioreactor the largest part of the moisture needed.

Liquid feed tubes 51 are, however, also connected to the upper portions of the bioreactor for sprinkling liquid on the filler material. Said liquid may either be clean water, liquid for pH adjustment or diluted microbe suspension. At need nutrients required for the microbe growth such as phosphate, potassium, ammonium and/or vitamins may be mixed into said liquid. It has, however, been observed that when the filter material is of organic origin, such as in the case of peat, it is not critical to add nutrients.

The liquid drained through the bioreactor may be removed from the system or it may be recirculated through a suspension recirculation system of the kind of FIG. 1.

The gas which has been partly or completely purified in bioreactor 10' is directed to the second bioreactor 10" for post-cleaning. The function of the bioreactor 10" corresponds to that of the bioreactor 10'. From the bioreactor 10" the purified gas is discharged through tube 20 and any liquid drained through the reactor is either removed or recirculated in the above described manner. The total retention time of the gas in the apparatus varies in accordance with the size of the reactor and the concentration of the contaminants in the gas. Said retention time is in the range of 0.5 to 10 minutes, preferably about 1 to 5 minutes (the retention time has been calculated on the basis of the volume of a filled reactor).

In a preferred embodiment of the process according to the invention carbon disulfide and/or hydrogen sulfide are removed from a waste gas containing such a sulfurous sparingly soluble gaseous component. The new microorganism Thiobacillus sp. TJ330 DSM 8985, which was found in a peat filter in connection with the work leading to the present invention, is preferably used as the degrading microorganism. The following lists characteristics of this microorganism, which is capable of degrading carbon disulfide:

rod-like, mobile cell (single and paired)

size 0.5×1–3 µm grows without carbon source→autotrophic (chemolitotrophic)

obtains its energy by oxidizing sulfur (end product sulfate, hydrogen sulfide and carbonyl sulfide are produced as intermediates)

grows in the pH range 1 to 6 (growth measured as sulfate yield)

pH in the growth solution may sink→0.6 so far, no oxidation of iron has been noted

The microorganism has a rod-like cell, which obtains its energy by oxidizing sulfur and which grows below 55° C. No sulfur production within the cell has been observed in a light microscope. It is clearly a question of a Thiobacillus (Bergey's manual page 1836–1837).

The invention will be illustrated in the following by working Examples which are, however, not intended to limit the invention in any way.

EXAMPLE 1

Enrichment of a Microbe Capable of Oxidizing Carbon Disulfide

Carbon disulfide oxidizing microbes were isolated from a peat filter material, which had been used in carbon disulfide filtering tests, by loading the exposed material with additional carbon disulfide in a nutrient solution. Aliquots (1 g) were taken from the peat material and were transferred to two gas washer flasks containing nutrient solutions (100 ml and 50 ml, respectively). Control flasks, which were not inoculated with peat, were provided for both enrichment cultures.

The flasks with the enrichment cultures were monitored for pH and sulfate content at the beginning of the test and thereafter once a week. Evaporation of liquid was monitored by weighing the flasks.

When the amount of sulfate had increased to about ten times the initial situation, 5% of the enrichment culture was used to inoculate another nutrient solution. In the new cultures the amount of organic material diminished and finally the growth solution contained merely inorganic salts and microorganisms, which obtained their energy supply by oxidizing carbon disulfide. The microorganism was given the name Thiobacillus sp. TJ330.

The sulfur formed as an intermediate in the oxidation of carbon disulfide, colored the solution yellow and when the carbon disulfide loading ended, the microbes started to oxidize sulfur into sulfate. As an intermediates of the carbon disulfide oxidation, hydrogen sulfide was also generated. This had been observed already in the enrichment cultures. Further, some carbonyl sulfide was generated.

EXAMPLE 2

Isolation of a Microbe Capable of Oxidizing Dimethyl Sulfide

A peat filter material was treated with lime and was inoculated with active sludge from a cellulose plant (Kuusankoski, Finland). The filtering tests showed dimethyl sulfide reduction right from the beginning of the test. With time the DMS reduction rose to almost 100%.

Enrichment cultures were taken from the filter material into gas washer flasks in the same way as was done when isolating a carbon disulfide oxidizing microbe in Example 1. The treatment provided a microbe suspension capable of oxidizing dimethyl sulfide. The microorganisms have not been identified.

A hydrogen sulfide degrading microbe strain was isolated in a similar way in a gas washer flask, and in the same way it is possible to isolate microorganisms which are capable of degrading other sparingly soluble gases. In case the microorganism is capable of degrading the gaseous component in question in a gas washer flask or in a fermentor, it may successfully be used in the method of the present invention.

For any isolated microorganism, respectively, its preferred pH range, required nutrients, etc. are determined using procedures which are well known in microbiology. The laboratory size apparatus of the invention may further be used for determining the retention time required in a microbe suspension and in a bioreactor for any given microorganism to provide an adequate degradation.

EXAMPLE 3

Oxidation of Carbon Disulfide in a Peat Filter

Two peat filters were constructed for the testing of the filtration of carbon disulfide. The diameters of the filters were about 10 cm, the peat columns were 20 to 30 cm high and the filters were connected in series. The peat material was a "Filter Peat" product, sold by Vapo Oy, Finland, and containing about 50% cotton grass. The biofilters were inoculated with the microbe strain Thiobacillus sp. TJ 330 DSM 8985 which is capable of oxidizing carbon disulfide.

A mixture of carbon disulfide in air was charged into the filters. The retention time of the gas in a filter varied between 50 sec. and 1 min. 30 sec.

|  | Filter 1. | Filter 2. |
| --- | --- | --- |
| volume | 1,6 l | 2,4 l |
| solids | 0,1 kg | 0,17 kg |
| retention time | 50 s–1 min 36 s | 1 min 12 s–2 min 24 s |
| concentration | $CS_2$ < 840 mg/m$^3$ | S 110–300 mg/m$^3$ |
| reduction | $CS_2$ 30–80% | S 80–99% |
| sulfur loading | about 700 mg–S/solids kg h, i.e. 30 g–S/filter m$^3$ h. | |

The concentrations of the sulfur compounds was analyzed with a portable gas chromatograph (AID model 511-19) which was provided with a flame photometric detector (FPD).

The test clearly showed that hydrogen sulfide is produced as an intermediate in the oxidation of carbon disulfide. The oxidation also produces carbonyl sulfide. The relative proportions of these two intermediates was, however, not determined. In the gas chromatographic determination the peaks of $H_2S$ and COS overlap. Since their total sulfur contents are the same, the relation between the two intermediates is not of importance in the total sulfur reduction.

At the end of a 20 days test run it was noted that sulfur and sulfate had accumulated in the filter material, which impaired the performance of the filters.

The results of the test are shown graphically in FIG. 3.

EXAMPLE 4

Large Sulfur Concentrations

The peat filter materials were treated with lime to provide a pH of 4. Both columns were inoculated with the carbon disulfide oxidizer Thiobacillus sp. TJ330 DSM 8985 before starting the new filtering tests.

|  | Filter 1. | Filter 2. |
| --- | --- | --- |
| volume | 1,8 l | 2,4 l |
| solids | 0,11 kg | 0,17 kg |
| pH | 4 | 2–3 |
| retention time | 57 s–154 s | 76 s–206 s |
| concentration | $CS_2$ 1470–5900 mg/m$^3$ | 1–3200 mg/m$^3$ |
|  | $H_2S$ 0–2160 mg/m$^3$ | 0,3–1500 mg/m$^3$ |
| reduction | S 31–99% | S 7–99% |
|  | total 36–99,99% | |
| loading | 113 g–S/filter m$^3$ h | |

The total sulfur loading varied in the range of 78–280 mg-S/h. The average of all the test days was 205 mg-S/h. The daily feed of sulfur was 4.8 g and, calculated on the basis of the dry solids weight, 1.9 g-S per filter solids kg h, 113 g-S per filter m$^3$h. Such a sulfur loading caused the generation of large amounts of sulfate and at the same time a strong lowering of the pH in the filter. The filters were rinsed from time to time but since the rinsing lowered the reductions, rinsings were performed less frequently. After a rinsing the reduction rose gradually but the sulfate accumulated in the filter lowered the pH of the material to such a low value that the oxidation of sulfur was retarded.

After two weeks the filtering efficiency sunk clearly. The filters were dissembled after the test and proved to be full of sulfur.

EXAMPLE 5

A Packed Reactor (Trickling Filter)

In the filtering tests performed with peat material a problem was caused by the accumulation of sulfate and sulfur in the material which lowered the filtering efficiency.

For the present Example a packed reactor according to the FIG. 2 was designed having glass beads (diameter 5 mm) as packing bodies. The height of the glass bead column was about 50 cm and the reactor diameter was 5 cm. The active part of the reactor comprised a biofilm formed on the surface of the glass beads, and a microbe suspension of Thiobacillus sp. TJ330 DSM 8985, which was circulated through the reactor. Contrary to the peat filter it was now possible to control the pH and nutrients of the microbe suspension. $PO_4$, K, $NH_3$ and vitamins were added as nutrients.

The gas was fed about 7 cm below the surface of the microbe suspension through an aquarium sinter (pore size about 160 to 200 μm). The pH control of the microbe suspension was performed with Ca(OH)$_2$ in a mixing vessel.

FIG. 4 shows the results of the filtering tests performed with the packed reactor. The maximum loading of the reactor was 73 g-S/m$^3$ of filter material h, whereby the reduction was 97%.

Results of the test are shown in the following Table.

| day | flow l/min | IN CS$_2$ ppm | IN S mg/m$^3$ | H$_2$S + COS ppm | OUT CS$_2$ ppm | OUT S mg/m$^3$ | reduction % | retention min |
|---|---|---|---|---|---|---|---|---|
| 10 |  | 3000 | 7837,20 | 200 | 210 | 809,92 | 89,67 |  |
| 13 |  | 1800 | 4702,32 | 5 | 2 | 11,76 | 99,75 |  |
| 19 | 0,04 | 1200 | 3134,88 | 0,4 | 0,2 | 1,05 | 99,97 | 9,75 |
| 34 | 0,20 | 800 | 2089,92 | 0,2 | 0,11 | 0,51 | 99,98 | 1,95 |
| 35 | 0,50 | 900 | 2351,16 | 22 | 14 | 65,32 | 97,22 | 0,78 |
| 38 | 0,50 | 600 | 1567,44 | 0,2 | 0,1 | 0,52 | 99,97 | 0,78 |
| 46 | 0,41 | 350 | 914,34 | 0,2 | 0,2 | 0,78 | 99,91 | 0,95 |
| 48 | 0,60 | 330 | 862,09 | 7,3 | 5,3 | 23,38 | 97,29 | 0,65 |

The test provided an almost complete oxidation of carbon disulfide by the use of a combination of a packed reactor and a bubbling into a microbe suspension at a short retention time. The generated sulfate was removed from the system in a controlled way and it did not disturb the continuous use of the apparatus.

EXAMPLE 6

The Oxidation of Carbon Disulfide in a Packed Reactor Alone and in a Suspension Alone In order to clarify the significance of the various parts of the apparatus used in Example 5, the microbe suspension was disconnected from the system and the gas was directed to a moistened packed reactor alone. When the loading rose to 1600 ppm CS$_2$, the reduction sunk sharply to a mere 36%.

In a corresponding way the packed reactor was disconnected from the system and the gas was directed merely into the microbe suspension. Although the loading was increased to 3000 ppm CS$_2$, the reduction in the microbe suspension alone was about 76%.

The test clearly indicates that the biodegradation of carbon disulfide is surprisingly successful in a microbe suspension alone.

EXAMPLE 7

The Oxidation of Dimethyl Sulfide in a Microbe Suspension and in a Peat Filter

The microbe isolated in Example 2 (unidentified) was inoculated into a microbe suspension and into a peat filter. A DMS containing gas was fed through a ceramic aquarium sinter (pore size about 160 to 200 μm) about 10 cm below the surface of the microbe suspension. The moist gas, which had risen to the surface, was directly led to the top of the peat filter. After some initial difficulties, the reduction begun to proceed well. The reduction in the microbe suspension was about 20% and the remaining 80% of the dimethyl sulfide was almost completely degraded in the peat filter.

Thus, dimethyl sulfide may also be successfully degraded in a microbe suspension according to the process of the present invention.

EXAMPLE 8

Oxidation of Carbon Disulfide in a Microbe Suspension and in a Subsequent Second Biodegradation Stage a) Packed Reactor An apparatus according to FIG. 1 inoculated with a microorganism according to Example 1 was used in the test. The height of the liquid column above the sinter in the microbe suspension was 10 cm. After an initial activation time, a test was performed, wherein 200 to 600 ml/min carbon disulfide containing gas was lead into the apparatus.

The concentration of carbon disulfide in the gas varied between 330 ppm and 1300 ppm. The reduction was 76 to 99.9%.

b) Microbe Suspension

In this test two microbe suspension reactors were used in series. The gas was bubbled into both reactors through aquarium sinters (pore size 160 to 200 μm). In the first reactor the liquid column above the sinter was 20 cm, in the second one it was 10 cm. The liquid was not recirculated. 400 to 500 ml/min of a carbon disulfide containing gas was fed into the apparatus.

A gas having a carbon disulfide concentration of 780 to 960 ppm was fed into the first reactor. The exiting gas had a concentration of 11 to 55 ppm, i.e. the reduction in the first reactor was 76 to 83%. Said gas was then fed to the second reactor, wherein the reduction was of the same order as in the first reactor, i.e. 59 to 84%. The total reduction of the apparatus was 92 to 98%.

EXAMPLE 9

Styrene Biofiltration Tests a) Purification of a Styrene Containing Gas in a Microbe Suspension Alone A bubbling reactor alone without any packing bodies was used in the test. The gas bubbling was performed through a ceramic aquarium sinter (through the side wall).

A microbe mixture which had previously been used in a solid filter and which removed 10 to 69% of the styrene in said solid filter, was used in the test. The microbe inoculant contained the strains *Alcaligenes xylosoxidans* VTT-E-93477, *Sphingomonas paucimobilis* VTT-E-93479, *Pseudomonas vesicularis* VTT-E-93482.

As nutrients NH$_4$NO$_3$, KH$_2$PO$_4$, MgSO$_4$, and later also CaCl$_2$, FeSO$_4$ and yeast extract, were added to the mixture.

During the test run the reduction of styrene varied between 33% and 95%, but the conditions also changed quite considerably, among others as regards the in-going styrene concentration. After slightly more than a week, the reduction had risen to >90%. However, due to the measuring techniques used, the results obtained with concentrations above 500 ppm cannot be regarded as being as reliable as the results obtained at the lowest concentrations.

b) Purification of Styrene in a Combination of a Microbe Suspension and a Packed Bioreactor The diameter of the utilized bioreactor was 5.4 cm and the height occupied by the microbe suspension and the packing bodies was 80 cm, i.e. the volume of the active material was about 1800 ml (the volume of the liquid portion was about 450 ml and that of the packing body portion was about 1350 ml). The packing bodies were saddle shaped and ceramic. The sinter was still a ceramic aquarium sinter (through the side wall).

The microbe suspension used was the same as that in point A1 above. The microbe densities varied between $6.9 \times 10^8$ and $6.0 \times 10^9$ cells/ml. The liquid recirculation operated during the day time at a speed of 10 ml/min. After about two weeks of use the liquid recirculation was increased to about 20 ml/min.

At high styrene concentrations samples were taken from the entering gas with a 100 ml syringe through a septum. Exiting gas was collected in a laminate bag. At lower concentrations samples were also taken from the entering gas into a bag through a side stream tube in order to retain a constant pressure resistance.

Nutrient was added a few times a week in the form of a nutrient solution containing $NH_4NO_3$, $KH_2PO_4$ $MgSO_4$, $CaCl_2$, $FeSO_4$ and yeast extract, which liquid had a strong buffering capacity. The pH remained almost constant during the whole run (pH 6.3).

The reduction varied between 55% and 98%, the average of the run being 82%.

c) Purification of a Styrene Containing Gas in a Combination of a Microbe Suspension and a Packed Bioreactor In this run the diameter of the bioreactor tube was 4.5 cm and the active volume (suspension+packing bodies) was only about 1100 ml. For gas bubbling a glass sinter, having the porosity characteristic 0 (nominal maximum porosities 160 to 250 µm) and a diameter of 2.2 cm, was used. The gas flow was fed into the sinter through the bottom of the suspension, keeping the sinter about 7 cm above the bottom level. The gas was discharged downwards from the sinter. The liquid bubbling portion occupied about 320 ml, of which 100 ml was below the sinter.

The microbe mixture contained the strains *Pseudomonas putida* VTT-E-93486, as well as the strains VTT-E-93476, VTT-E-93480, VTT-E-93485 for which the type had not been determined, in addition to the microbe suspension mentioned in point A2. The strains had been pre-cultured on a yeast extract mixture and styrene. As nutrient in the bioreactor the same mixture as that in point A2 was used.

The in-going styrene concentrations varied between 36 and 60 ppm (156 to 259 mg/m³). The net of the reactor's partition plate was too dense (it became blocked by a film of microbe mass), wherefore there are only a few results from the run. The obtained results were, however, promising, 66 to 100%.

d) Purification of a Styrene Containing Gas with a Combination of a Microbe Suspension and a Packed Bioreactor The culture from the previous run was transferred to a new reactor tube having a diameter of 5.4. cm and an active volume of about 1250 ml. The gas was bubbled through the bottom of the reactor through a gas distribution sinter (diameter 35 mm, porosity 1, corresponds to a nominal maximum pore size of 100 to 160 µm). The volume of the liquid portion of the reactor was about 450 ml and the volume of the packing body portion about 800 ml.

The same buffering nutrient solution was used as above, since with a mere trace element solution the pH sunk quickly.

The loadings varied in the concentration range of 33–290 ppm (143–1256 mg/m³), while the flow speeds varied between 100 and 1650 ml/min. Under these conditions the styrene reduction was >55–90%, on an average 93%.

At the end of the run, the reductions using packing bodies+liquid recirculation alone, and a microbe suspension (bubbling) alone, respectively, were studied. With packing bodes alone (flow 100 ml/min, loading 240 to 500 ppm) the reduction was over 97%. With bubbling alone (flow 100 ml/min, loading 82 to 495 ppm) the reduction was also 97%.

e) Purification of a Styrene Containing Gas With a Combination of a Microbe Suspension and a Packed Bioreactor The reactor was the same as in point A4 above, but the inoculant was chosen as *Pseudomonas chlororaphis* DSM 6508. The added nutrient was Mineral Medium 462 (DSM, slightly modified version).

The flow speed varied within the range of 150 to 650 ml/min. the mean styrene concentration of the in-going gas was 155 ppm. The reduction varied between 72% and 97%, the average of the whole run being 88%.

Summary of the Styrene Biofiltration

A summary of the filtering efficiency with different inoculants. The presented values are the mean values of the runs A2 (3 microbe strains), A4 (7 microbe strains) and A5 (DSM strain). The variations are disclosed in brackets.

|  | Run A2 | Run A4 | Run A5 |
|---|---|---|---|
| Loading ppm | 83 (23–200) | 139 (33–290) | 155 (82–212) |
| Flow ml/min | 600 (250–2500) | 550 (100–1650) | 400 (150–650) |
| Microbes cells/ml | $3.05 * 10^9$ | $2.47 * 10^9$ | $1.77 * 10^8$ |
| Reduction % | 82 (55–98) | 93 (>55–99) | 88 (72–97) |

The results show that a surprisingly effective degradation of styrene is provided with the process according to the present invention using different microbe strains.

EXAMPLE 10

Toluene Biofiltrations a) Purification of a Toluene Containing Gas in a Combination of a Microbe Suspension and a Packed Bioreactor The diameter of the bioreactor tube was 5.4 cm and the active volume was 1800 ml (packing body portion 1200 ml). The liquid recirculation was 90 ml/min. For gas bubbling a glass sinter having the porosity characteristic 0 (nominal maximum porosities 160 to 250 µm) and a diameter of 2.2 cm, was used. The gas flow was fed into the sinter through the bottom of the suspension keeping the sinter about 7 cm above the bottom level. The gas was discharged downwards from the sinter.

The microbe suspension contained the strains: *Alcaligenes xylosoxidans* VTT-E-93477, *Sphingomonas paucimobilis* VTT-E-93479, *Pseudomonas vesicularis* VTT-E-93482, *Pseudomonas putida* VTT-E-93486, as well as the un-typed strains VTT-E-93476, VTT-E-93480 and VTT-E-93485. $NH_4NO_3$, $KH_2PO_4$ and $MgSO_4$ were added as nutrients.

A summary of the measurements of the run B1 are disclosed in the following. The mean values are in brackets.

| Flow speed | 150–600 ml/min (350 ml/min) |
|---|---|
| Entering toluene conc. | 20–560 ppm (230 ppm) |
| Exiting toluene conc. | 5–214 ppm (65 ppm) |
| Reduction | 29–98% (70%) |

-continued

| Microbe density | average 7.5 * 10⁸ cells/ml |

At a flow speed below 200 ml/min the reduction was over 88%. At higher flow speeds the reduction was poorer.

b) Purification of a Toluene Containing Gas in a Combination of a Microbe Suspension and a Packed Bioreactor The reactor was the same as in the previous run but the inoculant was changed to *Pseudomonas putida* DSM 6413. The nutrient used was Brunner mineral medium 457 (DSM, modified).

The gas bubbling was performed through a ceramic aquarium sinter at the bottom of the filter. On top there was about 450 ml of liquid and packing bodies about 1350 ml.

A summary of the measurements of the run B2 are disclosed in the following. The mean values are in brackets.

| Flow speed | 150–800 ml/min (350 ml/min) |
| Entering toluene conc. | 132–374 ppm (250 ppm) |
| Exiting toluene conc. | 30–218 ppm (75 ppm) |
| Reduction | 42–91% (72%) |
| Microbe density | average 1.3 * 10⁸ cells/ml |

The filtration functioned best at flow speeds below 200 ml/min. At flows above this value the reduction was below 80%.

EXAMPLE 11

Dimethyl Sulfide (DMS) Biofiltrations

The removal of dimethyl sulfide was tested with a microbe strain cultured from sludge from Wisaforest (Finland) in a liquid bubbling reactor. At the beginning, liquid reactors were used alone in the tests.

The gas was fed into the reactor through a gas distribution sinter (diameter 35 mm, porosity 1, corresponds to a nominal maximum pore size of 100 to 160 μm, Laborex) at the bottom of the reactor.

The efficiency of the reactor, when loaded only with DMS, started to rise immediately after addition of the packing body portion. The efficiency of all the DMS reactors was clearly dependent on the pH. A condition for the function of the reactor is that the pH is between 6 and 7. The pH was adjusted with phosphate buffers. When studying the liquid portion in a microscope two kinds of cells could easily be seen: long immobile rods (10–20 μm) and small mobile rods (1 μm).

In a mere liquid bubbling, without packing bodies, the reductions varied between 0 and 88% and the average of the values was about 50%. The best reduction obtained with a mere liquid bubbling is 88% (liquid volume 1000 ml and gas flow speed 200 ml/min).

The reactor was later supplemented with packing bodies and a liquid recirculation of about 10 ml/min. The packing bodies were saddle shaped ceramic packing bodies having a diameter of 6 mm. The diameter of the reactor tube was 5 cm and the height of the liquid level was 20 cm (about 400 ml of liquid) and the height of the packing body portion was 40 cm (a volume of about 800 ml). The gas was introduced through a gas distribution sinter (diameter 35 mm, porosity 1, corresponds to a nominal maximum pore size of 100 to 160 μm, Laborex) at the bottom of the reactor.

A more than 90% reduction was achieved with the reactor during several consecutive days.

EXAMPLE 12

Biofiltration Test for Gas Mixtures Hydrogen Sulfide, Methyl Mercaptane and Dimethyl Sulfide The diameter of the reactor used in the test was 5.4 cm and the gas was introduced through the bottom of the reactor via a gas distribution sinter (diameter 35 mm, porosity 1, corresponds to a nominal maximum pore size of 100 to 160 μm). At the beginning of the test the liquid portion of the reactor occupied 450 ml and the packing body portion occupied about 800 ml (day 1: gas flow 500–600 ml/min; days 2 to 8: gas flow 1000 ml/min). On day 9 the packing body column was diminished from 800 ml to 200 ml and the liquid suspension to about 350 ml. The gas flow was 150 to 200 ml/min.

The pH of the nutrient solution was between 6 and 7. The formation of sulfate lowered the pH and the nutrient solution was neutralized by replacing a portion of the solution with fresh solution. The microbe suspension was the same as that used in the functioning DMS reactor. In a microscope one could clearly discern two different microbes (an immobile rod-like cell, length 10 to 20 μm, and a mobile rod-like cell, length 1 μm).

The concentrations and the reductions of the filtering tests are shown below. The unit is ppm.

| Time | hydrogen sulfide | | m-mercaptane | | dimethyl sulfide | | Reduction % | | |
| --- | --- | --- | --- | --- | --- | --- | --- | --- | --- |
| day | in | out | in | out | in | out | $H_2S$ | MM | DMS |
| 1 | 13 | | 30 | | 67 | | | | |
| 2 | 7 | 0 | 9 | 0 | 47 | 8 | 100,00 | 100,00 | 82,98 |
| 3 | 10 | 0 | 16 | 0 | 36 | 4 | 100,00 | 100,00 | 88,89 |
| 3,5 | 35 | 0 | 14 | 0 | 23 | 5 | 100,00 | 100,00 | 78,26 |
| 9 | 96 | 0,2 | 40 | 0,3 | 110 | 5 | 99,79 | 99,25 | 95,45 |
| 12 | 95 | 1,6 | 11 | 2,1 | 40 | 3,8 | 98,32 | 80,91 | 90,50 |
| 12,5 | 110 | 0 | 80 | 1,1 | 25 | 0,9 | 100,00 | 98,63 | 96,40 |
| 13 | 95 | 0 | 76 | 1,5 | 18 | 1 | 100,00 | 98,00 | 94,44 |

0 = below the determination level of 0,2 ppm
a 100% reduction is rather marked as >99%

EXAMPLE 13

Growth Test for Various Microbe Strains With Carbon Disulfide

The degradation of carbon disulfide in a gas washer flask was tested with the following strains:

*Thiobacillus thiooxidans* ATCC 19377 (type strain)
*Thiobacillus ferrooxidans* ATCC 23270 (type strain)
Thiobacillus TJ330 DSM 8985
Growth:
  temperature 24±2° C., growth time about one month
  mediums ATCC catalogue:
    125 without sulfur (ATCC 19377 and DSM 8985) 64A (ATCC 23270)

The strains were cultured in gas washer flasks in inorganic nutrient solutions (200–350 ml), from which sulfur and iron sulfate, which normally function as substrates, had been left out. A carbon disulfide containing gas was introduced into the nutrient solution. Its concentration was about 500 ppm, its flow speed about 30 ml/min. The carbon disulfide was obtained by evaporation from a liquid into the gas which was introduced into the gas washer flasks through sterilized 0.2. μm millipore filters. The discharge gas was bubbled into 70% ethanol. No test for possible contaminants was performed.

Results:

Out of the tested strains only Thiobacillus DSM 8985 oxidizes carbon disulfide. The other strains showed no signs of carbon disulfide oxidation during the one month long growth period. Thiobacillus DSM 8985 had all the characteristics of growth:

- the amount of sulfate increased
- the pH sunk
- the microbe density increased
- hydrogen sulfide and carbonyl sulfide (measured in the discharge gas) were generated
- the carbon disulfide content sunk The above examples illustrate that the biodegradation of sparingly-soluble gases in a microbe suspension surprisingly functions very well with the process according to the invention. Adjusting the conditions in a microbe suspension is very easy and with a microbe suspension it is possible to significantly and quickly reduce the pollutant level of a gas so that a second biodegradation stage placed thereafter can remove the remaining pollutant from the gas. For instance, the problems encountered with peat filters in cases where the carbon disulfide content is high, are eliminated in case the pollutant concentration is lowered by pre-cleaning the gas in a microbe suspension prior to directing it into a peat filter.

In the above description the invention has primarily been illustrated by showing the oxidation of carbon disulfide and hydrogen sulfide with the preferred microorganism of the invention. It is, however, evident to those skilled in the art that for the degradation of carbon disulfide and hydrogen sulfide it is possible to use other known microorganisms or microorganisms especially isolated for the need in question, which microorganisms have the capacity of degrading this sparingly-soluble pollutant in a microbe suspension. In a corresponding way the removal of other sparingly-soluble gases from gases may succesfully be performed by pre-cleaning in a microbe suspension with microorganisms isolated from the nature or obtained commercially. In this way the pollutant level in a gas can be reduced in a microbe suspension either in a sufficient degree or to such a level that the pollutant level can be lowered adequately in a subsequent bioreactor.

We claim:

1. A process for the removal of sparingly-soluble gaseous substances from a gas by bringing said gas into contact with microorganisms capable of degrading said sparingly-soluble gaseous substances, characterized in that said gas containing said sparingly-soluble gaseous substance is led into a microbe suspension containing microorganisms capable of degrading said substance such that said gas forms small bubbles in said microbe suspension, on the surface of which bubbles the microorganisms are able to degrade the sparingly-soluble gaseous substance, and, if needed, the gas which has risen to the surface of said suspension is directed to another similar or different biodegradation stage.

2. Process according to claim 1, characterized in that said gas is led into said microbe suspension through a gas bubbling means comprising a multitude of small openings.

3. Process according to claim 1, characterized in that the gas which has been led into said microbe suspension is distributed into small bubbles by mixing, by directing it through a perforated plate or grating, or in some other way.

4. Process according to claim 2, characterized in that the size of said openings is about 10 μm to about 2 mm, preferably about 100–500 μm.

5. Process according to claim 1, characterized in that the gas which has risen to the surface of said microbe suspension is led directly to another microbe suspension or to a bioreactor or a biofilter, the filler or packing of which comprises immobilized microorganisms capable of degrading said gaseous substance.

6. Process according to claim 1, characterized in that said other biodegradation stage comprises a trickling filter and that the gas which has risen to the surface of said microbe suspension is directed to the bottom of said filter and that microbe suspension is directed to the top of said filter.

7. Process according to claim 1, characterized in that said other biodegradation stage comprises a biofilter having an organic material, preferably peat, as its filler.

8. Process according to claim 1, characterized in that the gas to be purified is moisturized in said microbe suspension to a moisture content of at least 95%, preferably a moisture content of 95–100%.

9. Process according to claim 1, characterized in that said gaseous substance which is to be degraded is carbon disulfide, hydrogen sulfide, dimethyl sulfide, mercaptane, styrene, toluene, or a corresponding sparingly-soluble gas or gas mixture which is microbiologically degradable in said suspension.

10. Process according to claim 1, characterized in that said gaseous substance which is to be degraded is a gas mixture containing hydrogen sulfide, dimethyl sulfide and mercaptane.

11. A process for the removal of sparingly-soluble sulphur-containing gaseous substances from a gas by bringing said gas into contact with microorganisms capable of degrading said sulphur-containing substances, characterized in that said gas containing said sparingly-soluble sulphur-containing substance or substances is led into a microbe suspension containing microorganisms capable of degrading said substance while distributing said gas in the liquid into gas bubbles such that said microorganisms degrade at least a part of said sulphur-containing substance as said bubbles rise towards the surface of said microbe suspension and that, if needed, the gas which has risen to the surface of said suspension is directed to another similar or different biodegradation stage.

12. Process according to claim 11, characterized in that said degrading microorganism is an aerobic microorganism and that said gas which is to be purified is an oxygen-containing gas, such as air.

13. Process according to claim 11, characterized in that said gas which is to be purified is distributed into small bubbles by directing said gas into said suspension through a multitude of small openings the diameter of which is about 10 μm to about 2 mm, preferably 100 μm–500 μm, or by breaking said gas into bubbles by mixing, by using a grating or a perforated plate, or in some other way.

14. Process according to claim 11, characterized in that the gas which has risen to the surface of said microbe suspension is led directly to another microbe suspension or to a bioreactor or a biofilter, the filler or packing of which comprises immobilized microorganisms capable of degrading said gaseous substance.

15. Process according to claim 11, characterized in that the gas which has risen to the surface of said microbe suspension is directed to the bottom of a trickling filter and that microbe suspension is directed to the top of said filter.

16. Process according to claim 11, characterized in that said sparingly-soluble gaseous component which is to be degraded is carbon disulfide, hydrogen sulfide, dimethyl sulfide, mercaptane, and/or a mixture of any of these.

17. Process according to claim 11, characterized in that said microbe suspension contains as said microorganism a microorganism of the genus Thiobacillus which uses carbon disulfide and/or hydrogen sulfide as its source of energy.

18. Process according to claim 17, characterized in that said microorganism is Thiobacillus sp. TJ330 DSM 8985.

19. An apparatus for the removal of sparingly-soluble gaseous substances from gases by the use of microorganisms capable of degrading said sparingly-soluble substances, characterized in that said apparatus comprises a microbe suspension chamber (16) having below its liquid filling level (22) a feed pipe (24) for the gas which is to be purified, as well as at least one bioreactor (10; 10', 10") placed in direct connection with said chamber (16), the packing or filler of said reactor comprising immobilized therein microorganisms capable of degrading said sparingly-soluble gaseous substance.

20. Apparatus according to claim 19, characterized in that said gas feed pipe (24) ends in perforated tubes or sinter tubes (26) for distributing said gas as small bubbles below said liquid filling level (22) of said suspension chamber (16).

21. Apparatus according to claim 20, characterized in that the pore size of said sinter tube (26) is about 10 to 500 μm.

22. Apparatus according to claim 19, characterized in that said apparatus comprises a mixer, grating or corresponding means for the distribution of said gas into smaller bubbles and/or for increasing the retention time of said gas.

23. Apparatus according to claim 19, characterized in that said apparatus comprises a microbe suspension recirculation arrangement leading from said microbe suspension chamber (16) to the top of at least one bioreactor (10).

24. Apparatus according to claim 19, characterized in that said bioreactor is a trickling filter (10) filled with packing bodies (12), or a biofilter (10', 10") filled with an organic material, preferably peat.

25. Apparatus according to claim 19, characterized in that the microorganisms which are immobilized in the filler or on the packing bodies are microorganisms belonging to the genus Thiobacillus which utilize carbon disulfide and/or hydrogen sulfide as their energy source.

26. Apparatus according to claim 25, characterized in that said microorganism is Thiobacillus sp. TJ330 DSM 8985.

27. An isolated and purified microorganism culture which is capable of degrading sparingly-soluble gases in a microbe suspension, characterized in that said microorganism is Thiobacillus sp. TJ330 DSM 8985, which is capable of degrading carbon disulfide and hydrogen sulfide from a gas flow bubbling through a microbe suspension.

* * * * *